United States Patent [19]
Hodge et al.

[11] Patent Number: 5,740,584
[45] Date of Patent: Apr. 21, 1998

[54] RELEASABLE CASTER HOLDER

[75] Inventors: Allan M. Hodge; Anthony A. Hodge, both of San Diego, Calif.

[73] Assignee: Hodge Products, Inc., El Cajon, Calif.

[21] Appl. No.: 695,714

[22] Filed: Aug. 12, 1996

[51] Int. Cl.[6] ................................................. B60B 33/00
[52] U.S. Cl. ........................................................... 16/30
[58] Field of Search ................................ 16/30, 29, 40, 16/42 R, 49; 248/346.1

[56] References Cited

U.S. PATENT DOCUMENTS

| | | | |
|---|---|---|---|
| 3,667,085 | 6/1972 | Cumella et al. | 16/30 |
| 4,719,663 | 1/1988 | Termini | 16/30 |
| 4,817,237 | 4/1989 | Murphy | 16/30 |
| 4,843,678 | 7/1989 | Park | 16/30 |

*Primary Examiner*—Chuck Y. Mah
*Attorney, Agent, or Firm*—Brown, Martin, Haller & McClain

[57] ABSTRACT

A caster holder includes an open frame and retainers for holding the plate of a caster at two ends. The open structure of the frame is economical and minimizes weight. The frame may be economically manufactured by bending a single strip of metal. The frame may be provided to the user in kit form for the user to weld to an object. The retainers may include a fixed rod or a lip at one end and a removable bolt at the other.

12 Claims, 3 Drawing Sheets

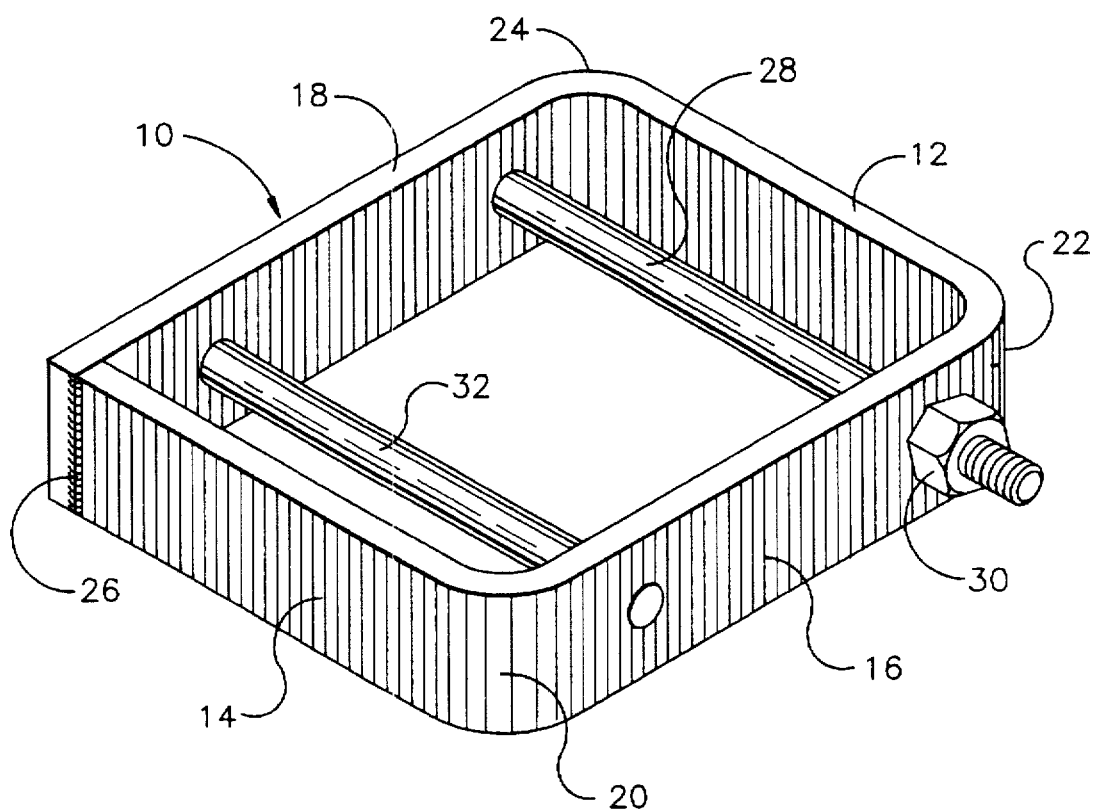
Fig.1
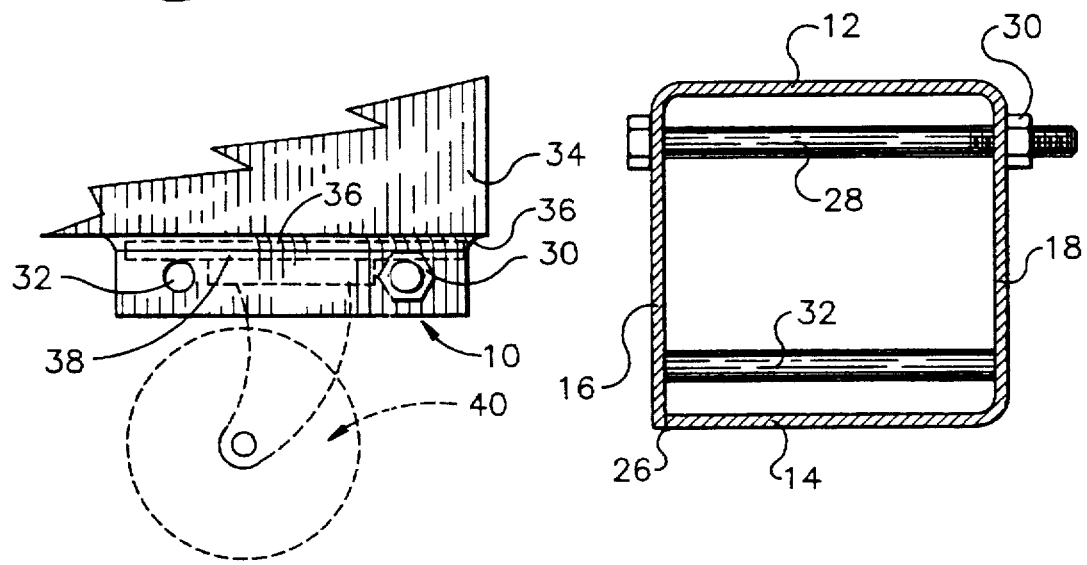
Fig.2
Fig.3

RELEASABLE CASTER HOLDER

BACKGROUND OF THE INVENTION

Casters may be attached to heavy, unwieldy objects, such as commercial trash bins. Welding or otherwise permanently attaching casters to such articles inhibits replacement of the casters if they become damaged. Releasable caster holders, also known as caster pads, have been developed that facilitate replacement of damaged casters. A releasable caster holder is disclosed, for example, in U.S. Pat. No. Des. 355,833, issued to Seaquiet. The caster holder includes a piece of metal having a back or pad portion, two side portions and a lip. A bolt, extending through holes in the sides, is also included. A caster may be removably mounted in the caster holder by placing one end of the caster plate under the lip with the caster plate against the back portion and inserting and fastening the bolt.

Releasable caster holders are typically sold separately from commercial trash bins to retrofit existing bins. To retrofit a trash bin, the user welds the back of the caster holder to the bottom of the bin.

It would be desirable to provide a releasable caster holder that is more economical than caster holders known in the art. This and other problems and deficiencies are clearly felt in the art and are solved by the present invention in the manner described below.

SUMMARY OF THE INVENTION

The present invention is a caster holder that includes an open frame and means for retaining the plate of a caster at two ends. The open structure of the frame is economical and minimizes weight. The frame may comprise two end walls and two side walls, formed in any suitable manner. For example, a single strip of metal may be bent at three 90 degree corners. In certain embodiments the frame may comprise two or more portions that are supplied as a kit in an unconnected state. A user retrofits an object, such as a commercial trash bin, with the caster holder by welding the periphery of the frame to the underside of the trash bin. In embodiments in which the frame comprises two or more portions the user may weld each frame portion to the trash bin or may weld both frame portions to each other and to the trash bin. Such embodiments may be even more economical because they may further reduce manufacturing costs by providing the caster holder in kit form and leaving one or more welding steps to the user. Because the user must weld the frame to the object in any event, the user is thus not significantly further inconvenienced.

The retaining means may comprise any suitable combination of bolts, rods, lips and similar structures. For example, a first retaining means adjacent one end of the frame may comprise a bolt releasably secured through openings in the sides of the frame by a nut. A second retaining means adjacent the other end of the frame may comprise, for example, a rod fixedly secured between the sides of the frame. Alternatively, for example, the second retaining means may comprise a lip under which the caster plate may be retained. To mount a caster, one end of the caster plate is inserted under the second retaining means, and the first retaining means is then fastened over the other end of the caster plate.

The primary advantage of the present invention is that manufacturing costs and shipping weight are minimized. Manufacturing costs are minimized because the structure of the frame is less complex than that of conventional releasable caster holders. As noted above, the frame may be formed as simply as bending a single strip of metal, whereas conventional caster holders typically include a number of more complex bends. Shipping weight is minimized because the caster holder of the present invention has no back or pad portion. The back portion that is included in a conventional caster holder adds weight but is unnecessary, because a commercial trash bin or similar object may be supported directly on the caster plate without additional reinforcement. Providing a caster holder without a back portion reduces weight by a factor of more than one-half. Weight is an important consideration because shipping costs are directly related to weight and account for a relatively large portion of the total cost of retrofitting a trash bin or other object.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein:

FIG. 1 is a perspective view of a caster holder;

FIG. 2 is a side elevation view of the caster holder of FIG. 1 mounted on a trash bin, showing a caster releasably retained therein;

FIG. 3 is a top plan view of the caster holder of FIG. 1;

DESCRIPTION OF A PREFERRED EMBODIMENT

Figure 4:
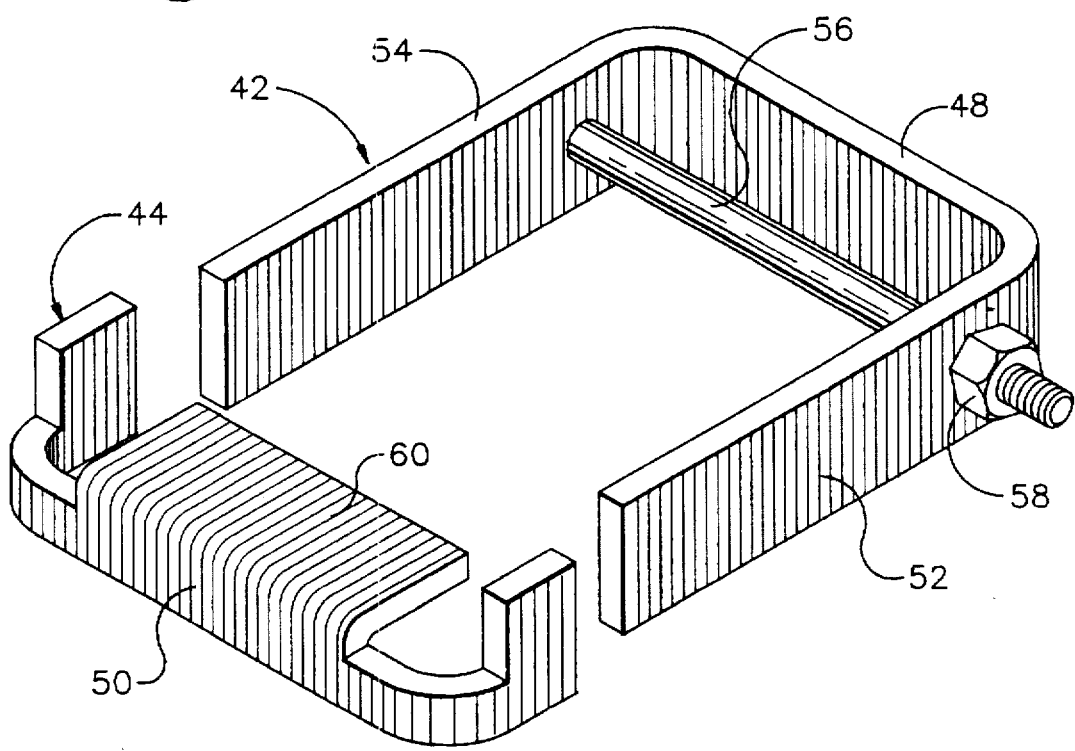
FIG. 4 is a perspective view of an alternative caster holder.

As illustrated in FIGS. 1 and 3, a caster holder includes a frame 10 having a first end wall 12, a second end wall 14, a first side wall 16 and a second side wall 18. Frame 10 may be made by bending a single strip of metal at 90 degrees at each of three corners 20, 22 and 24. At the fourth corner 26, side wall 18 may be welded to end wall 14.

The caster holder further includes a first means for retaining a caster adjacent first end wall 12 and a second means for retaining a caster adjacent second end wall 14. Adjacent first end wall 12 is a bolt 28 that extends through openings in each of side walls 16 and 18 and is retained by a nut 30. Adjacent second end wall 14 is a rod 32 that is welded at each of its ends in openings in side walls 16 and 18.

As illustrated in FIG. 2, a user may retrofit an existing commercial trash bin 34 or other object with the caster holder. The user forms a weld 36 around the periphery of frame 10. To use the caster holder, the user inserts a caster 40 into the holder, inserting one end of the plate 38 of the caster between rod 32 and the underside of trash bin 34. Then, with plate 38 against the underside of trash bin 34, the user inserts bolt 28 through the openings in side walls 16 and 18 and fastens it with nut 30.

Figures 5, 6:
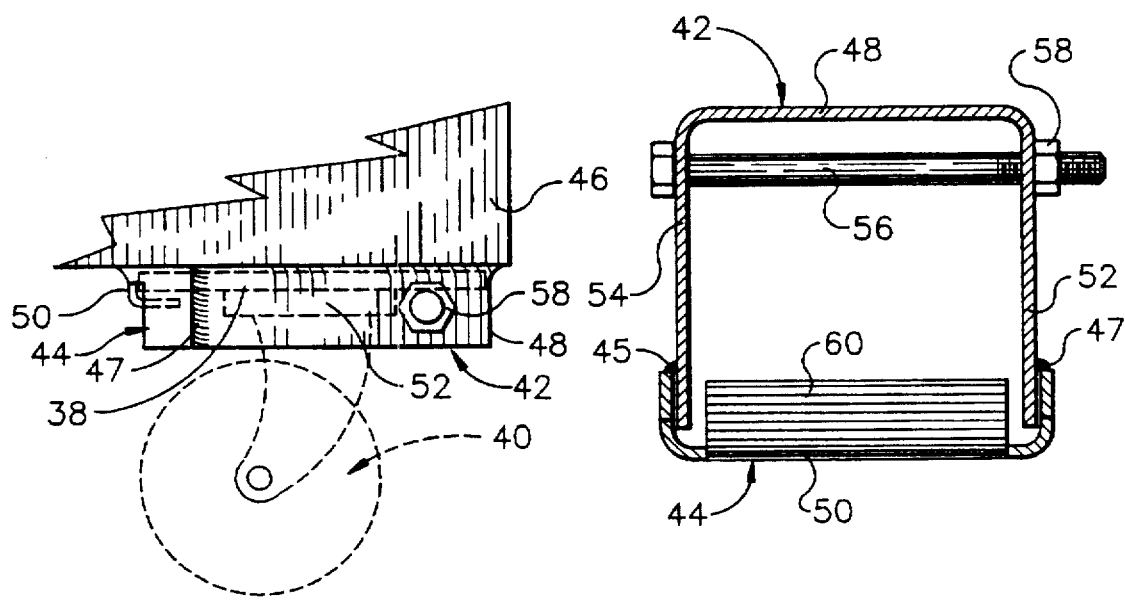
FIG. 5 is a side elevation view of the caster holder of FIG. 4 mounted on a trash bin, showing a caster releasably retained therein.
FIG. 6 is a top plan view of the caster holder of FIG. 4.

As illustrated in FIGS. 4 and 6, in an alternative embodiment a caster holder includes two frame portions 42 and 44. This embodiment further reduces manufacturing costs because the manufacturing process may include no welding steps. For example, in the embodiment described above with respect to FIG. 1, it is preferred that the manufacturer weld the frame closed at corner 26. Nevertheless, because the user must weld the caster holder to the underside of the trash bin or other object in any event, it is more economical to defer welding to the user. In this embodiment, the user mounts the caster holder to a trash bin 46 by welding frame portions 42 and 44 to the underside of trash bin 46, as illustrated in FIG. 5. The user is not inconvenienced because the extent of the welding is no greater than it would be if the frame were to consist of a single piece, such as frame 10 described above with respect to the embodiment illustrated in FIGS. 1–3. Nevertheless, as illustrated in FIG. 5, the user may also weld frame portions 42 and 44 to one another at points 45 and 47. When mounted on trash bin 46, frame portions 42 and 44 together define first and second end walls 48 and 50, respectively, and first and second side walls 52 and 54, respectively.

As in the above-described embodiment, in this embodiment frame portion 42 has a first means for retaining a caster adjacent first end wall 48 and a second means for retaining a caster adjacent second end wall 50. Adjacent first end wall 48 is a bolt 56 that extends through openings in each of side walls 52 and 54 and is retained by a nut 58. Unlike the above-described embodiment, however, in this embodiment the second means for retaining a caster comprises a lip 60 in end wall 50. Lip 60 is preferably an "L"-shaped bend in end wall 50 but may alternatively comprise any suitable bent or welded structure.

To use the caster holder, the user inserts a caster 40 into the holder, inserting one end of the plate 38 of the caster between lip 60 and the underside of trash bin 46. Then, with plate 38 against the underside of trash bin 46, the user inserts bolt 56 through the openings in side walls 52 and 54 and fastens it with nut 58.

Figure 7:
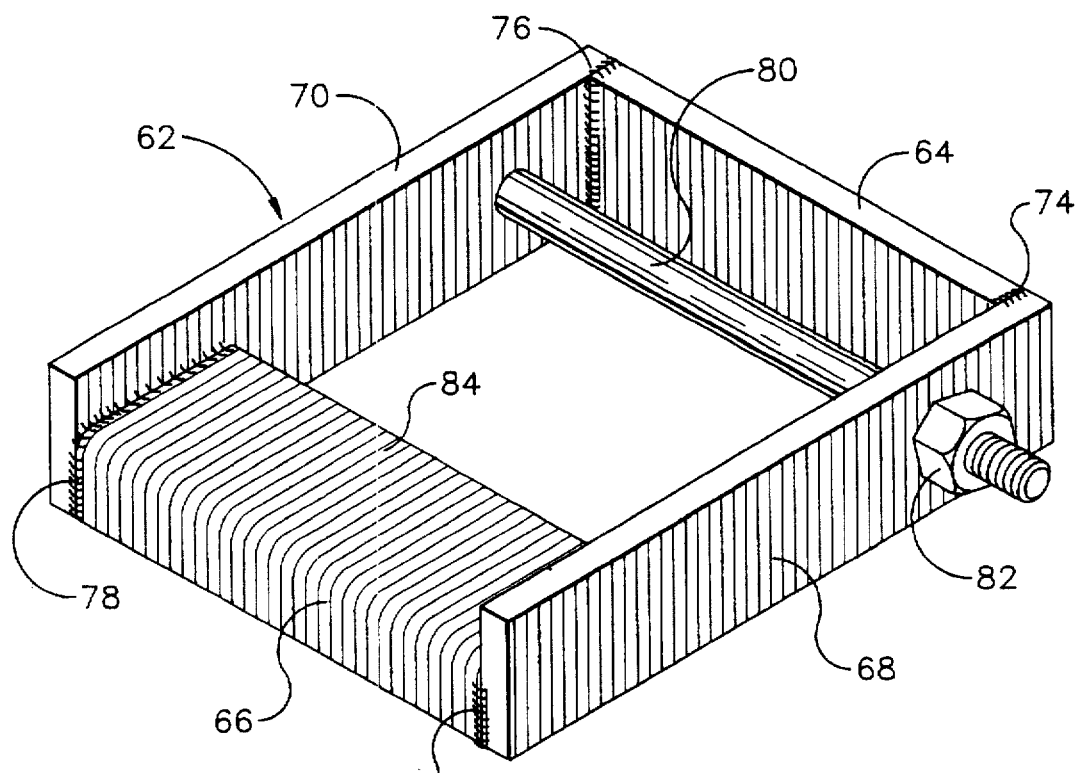
FIG. 7 is a perspective view of another alternative caster holder.

As illustrated in FIG. 7, in another alternative embodiment, similar to that described above with respect to FIG. 1, a caster holder includes a frame 62 having a first end wall 64, a second end wall 66, a first side wall 68 and a second side wall 70 that may be made by welding three metal strips together at corners 74 and 76. At corners 72 and 78, side walls 68 and 70 may be welded to end wall 66. As in the above-described embodiment, the caster holder further includes a first means for retaining a caster adjacent first end wall 64 and a second means for retaining a caster adjacent second end wall 66. Adjacent first end wall 64 is a bolt 80 that extends through openings in each of side walls 68 and 70 and is retained by a nut 82. The second retaining means is a lip 84 formed in second end wall 66. The caster holder may be mounted on a commercial trash bin or other object and used to releasably retain caster 40 in the manner described above with respect to the embodiment illustrated in FIG. 1.

Figure 8:
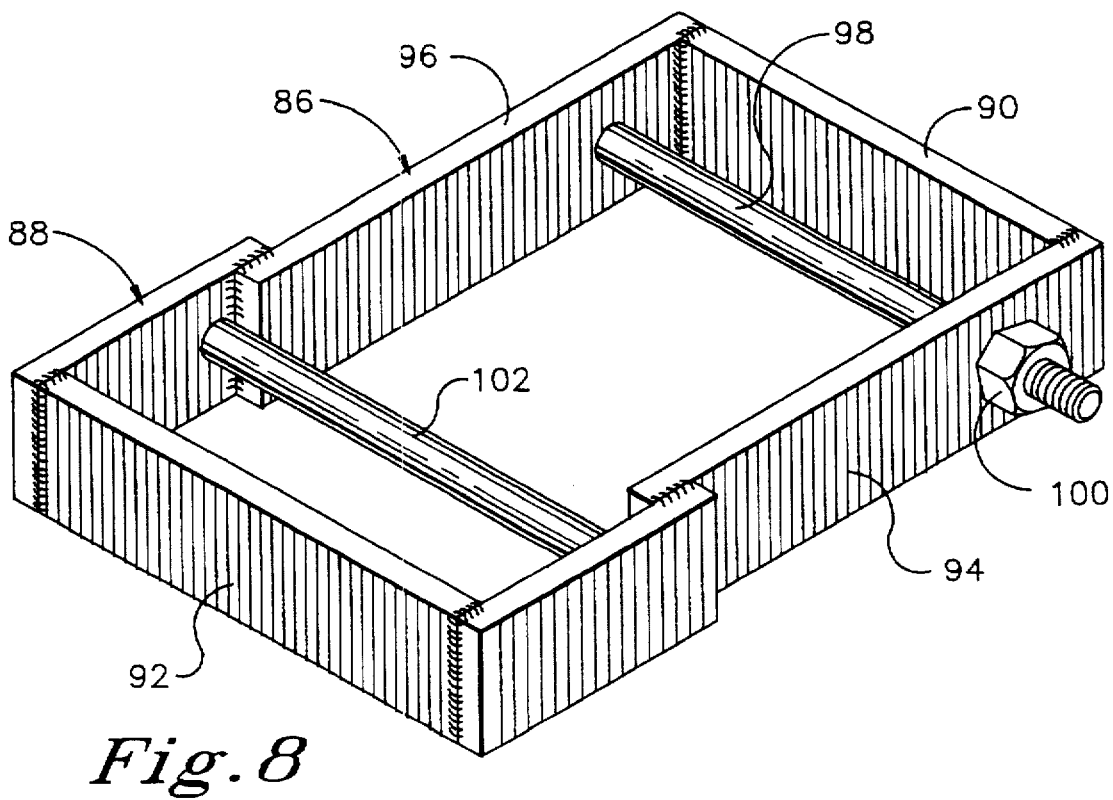
FIG. 8 is a perspective view of a still another alternative caster holder.

As illustrated in FIG. 8, in still another alternative embodiment, a caster holder includes two frame portions 86 and 88. When mounted on trash bin 46 in a manner similar to that described above with respect to FIG. 4, frame portions 86 and 88 together define first and second end walls 90 and 92, respectively, and first and second side walls 94 and 96, respectively. As in the above-described embodiments, frame portion 86 has a first means for retaining a caster adjacent first end wall 90 and a second means for retaining a caster adjacent second end wall 92. Adjacent first end wall 90 is a bolt 98 that extends through openings in each of side walls 94 and 96 and is retained by a nut 100. Adjacent second end wall 92 is a rod 102 that is welded at each of its ends in openings in side walls 94 and 96.

The present invention minimizes manufacturing and shipping costs by providing a caster holder having a frame with no back or pad portion. Manufacturing costs may be further reduced in certain embodiments by providing a kit having two or more frame portions that the user assembles when mounting the caster holder to an object.

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

What is claimed is:

1. A caster holder, consisting of:
   a frame having a first end wall, a second end wall, a first side wall and a second side wall;
   a first retaining means adjacent said first end wall and extending at least part of the distance between said first and second side walls for retaining a first end of a caster plate; and
   a second retaining means adjacent said second end wall and extending at least part of the distance between said first and second side walls for retaining a second end of a caster plate.

2. The caster holder recited in claim 1, wherein said first retaining means is releasable.

3. The caster holder recited in claim 2, wherein said first retaining means comprises a bolt releasably secured through openings in said first and second side walls by a nut.

4. The caster holder recited in claim 1, wherein said second retaining means comprises a rod extending between said first and second side walls and fixedly secured to at least one of said first and second side walls.

5. The caster holder recited in claim 1, wherein:
   said first retaining means comprises a bolt releasably secured through openings in said first and second side walls by a nut; and
   said second retaining means comprises a rod extending between said first and second side walls and fixedly secured to at least one of said first and second side walls.

6. The caster holder recited in claim 1, wherein:
   said first retaining means comprises a bolt releasably secured through openings in said first and second side walls by a nut; and
   said second retaining means comprises a lip formed in said second end wall.

7. A caster holder kit, consisting of:
   a frame having a first end wall, a second end wall, a first side wall and a second side wall, said frame comprising at least two connectable frame portions;
   a first retaining means adjacent said first end wall and extending at least part of the distance between said first and second side walls for retaining a first end of a caster plate; and
   a second retaining means adjacent said second end wall and extending at least part of the distance between said first and second side walls for retaining a second end of a caster plate.

8. The caster holder kit recited in claim 7, wherein said first retaining means is releasable.

9. The caster holder kit recited in claim 8, wherein said first retaining means comprises a bolt releasably secured through openings in said first and second side walls by a nut.

10. The caster holder kit recited in claim 7, wherein said second retaining means comprises a rod extending between said first and second side walls and fixedly secured to at least one of said first and second side walls.

11. The caster holder kit recited in claim 7, wherein:

said first retaining means comprises a bolt releasably secured through openings in said first and second side walls by a nut; and said second retaining means comprises a rod extending between said first and second side walls and fixedly secured to at least one of said first and second side walls.

12. The caster holder kit recited in claim 7, wherein:

said first retaining means comprises a bolt releasably secured through openings in said first and second side walls by a nut; and said second retaining means comprises a lip formed in said second end wall.

* * * * *